June 30, 1925. 1,544,153
F. HOLMGREN
EXTENSIBLE LEVEL AND STRAIGHTEDGE
Filed Jan. 20, 1925 2 Sheets-Sheet 2
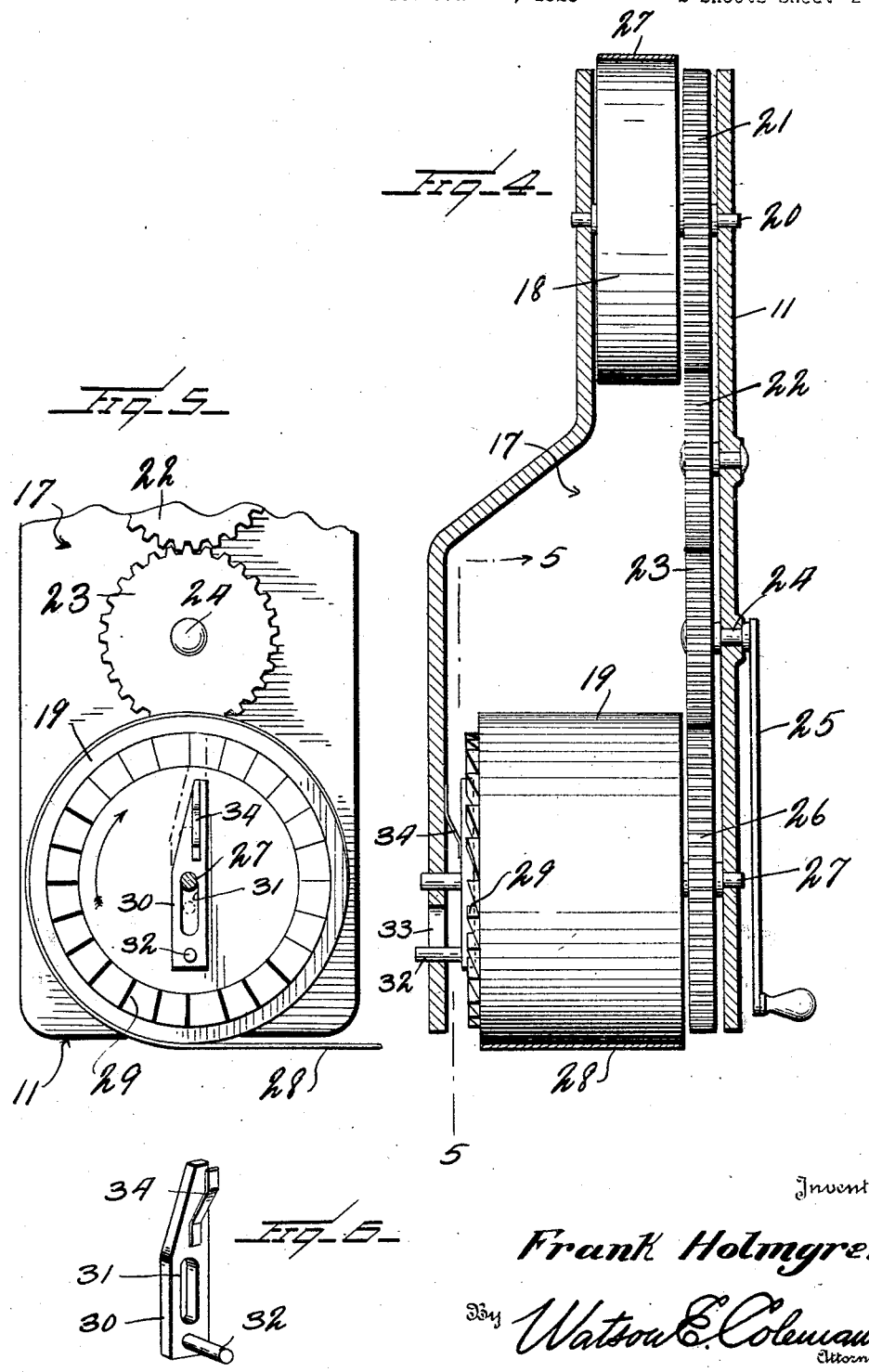
Inventor
Frank Holmgren
By Watson E. Coleman
Attorney Patented June 30, 1925.

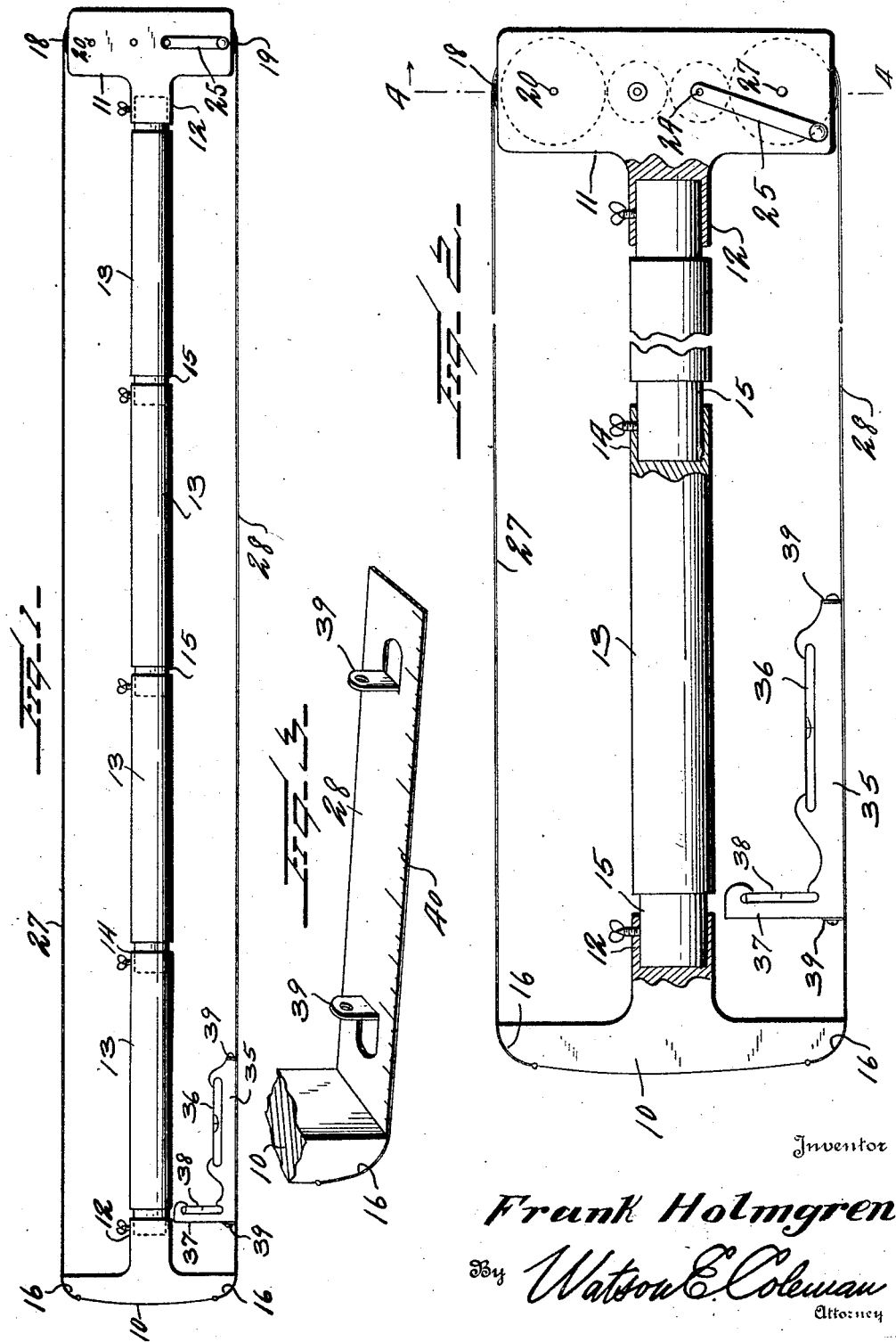

1,544,153

UNITED STATES PATENT OFFICE.

FRANK HOLMGREN, OF STAGG, CALIFORNIA.

EXTENSIBLE LEVEL AND STRAIGHTEDGE.

Application filed January 20, 1925. Serial No. 3,652.

*To all whom it may concern:*

Be it known that I, FRANK HOLMGREN, a subject of the King of Sweden, residing at Stagg, in the county of San Bernardino and State of California, have invented certain new and useful Improvements in Extensible Levels and Straightedges, of which the following is a specification, reference being had to the accompanying drawings.

This invention relates to levels and straight edges, and the general object of the invention is to provide an instrument of this character which is extensible or contractible within certain limits to any desired extent.

A further object is to provide a device of this character wherein the straight edge is formed by a steel tape which is mounted upon a roller at one end of the device and may be held taut, which roller permits the straight edge to be extended as the instrument is expanded.

A still further object is to provide an instrument of this kind having a shank or body formed of a plurality of sections adapted to be disposed within sockets so as to increase or decrease the length of the instrument as a whole and provided with a steel tape extensible with the extension of the instrument.

Another object is to provide a steel tape with a level attached thereto permitting the device to be used for leveling or for plumbing of objects.

Other objects have to do with the details of construction and arrangement of parts as will appear more fully hereinafter.

My invention is illustrated in the accompanying drawings, wherein:—

Figure 1 is a side view of a level and straight edge constructed in accordance with my invention;

Figure 2 is an enlarged side view partly in section;

Figure 3 is a perspective view of a portion of the tape 28 showing the manner in which the level is supported on the tape;

Figure 4 is a section on the line 4—4 of Figure 2;

Figure 5 is a section on the line 5—5 of Figure 4;

Figure 6 is a detail perspective view of the latch or pawl;

Referring to these drawings, it will be seen that my instrument comprises end sections or terminal heads, designated 10 and 11, each of these being formed with a socket 12, and adapted to be disposed between the terminal heads and hold them apart are a plurality of intermediate members 13, each of these members being formed at one end with a socket 14 and at the opposite end with a reduced portion 15 which may be externally screw-threaded, if desired, and which is adapted to fit within the socket 14 of the next adjacent section 13 or fit within one of the sockets 12 on the heads 10 and 11. The head 10 is formed with a flat outer face, the extremities of this outer face being rounded at 16. The head 11, on the other hand, is hollow and preferably laterally enlarged so as to form a chamber 17. Within one end of the chamber there is mounted a roller or winding drum 18, and in the opposite end of the chamber there is mounted a roller or winding drum 19.

Mounted upon the shaft 20 of the drum 18 is a gear wheel 21 which meshes with an intermediate gear wheel 22, which in turn meshes with a driving gear wheel 23 mounted upon a shaft 24 and having a crank handle 25. This gear wheel 23 drives a gear wheel 26 mounted upon a shaft 27 of the roller 19. Thus it will be seen that by turning the crank 25 the rollers 18 and 19 will be operated in reverse directions.

Attached at one end to the roller 18 is a steel tape 27. This is attached at its other end to one rounded extremity of the terminal head 10. It preferably is permanently attached thereto. The roller 19 has mounted thereon one end of a steel tape 28, the opposite extremity of which is attached to the other extremity of the head 10 so that the two halves 27 and 28 are disposed in parallel relation, and when these rollers are turned sufficiently the steel tapes will be drawn taut and will be comparatively rigid.

In order to prevent any slackening of the tapes after they are turned up, I provide the roller 19 upon its outside face with ratchet teeth 29 and mount upon the inside face of the head 11 a pawl or latch 30 which is slidably mounted so as to extend into engagement with the teeth or be shifted out of engagement with the teeth. This latch is slotted at 31 to embrace the pin 27. This latch or pawl 30 is provided with an outstanding pin 32 which projects out through a slot 33 in the wall of the head 11. A leaf spring 34 is mounted upon the latch and forces the latch or pawl against the teeth 29 when the latch is shifted radially outward.

When it is desired to keep the tape taut, this latch or pawl is shifted outward and engages the teeth 29 and then as the crank 25 is rotated it will be obvious that the pawl will ride over the teeth 29 but will prevent any back latch or back motion. If it be desired to adjust the instrument, however, for length, it is obvious that the pawl or latch may be shifted away from the teeth 29 and in that case the tapes may be readily drawn out or wound up until the desired number of sections have been interposed between the heads 10 and 11.

Mounted upon the tape 28 at any desired point thereon but obviously by preference adjacent the head 10 is a level 35 having a bubble glass 36 which is disposed parallel to the tape 28, and one end of this level 35 carries upon it an arm or body portion 37 which is at right angles to the body of the level 35 and also carries a bubble glass 38. While I do not wish to be limited to any particular manner of mounting the level 35 with the level 37 upon the tape 28, I preferably form the tape with struck-up lugs 39 and the body 35 is disposed between these struck-up tongues 39 and held in place by screws, pins or any other suitable means passing through the lugs 39.

In the use of this device, the instrument is made as long as desired by inserting sections 13 between the heads 10 and 11, each section, of course, fitting in the socket of a next adjacent section and in turn receiving the end of a next adjacent section. When the instrument has been made as long as necessary, the crank 25 is turned to tighten up on the tapes 27 and 28 until these tapes are as taut as possible. The instrument may be then used as a straight edge and as a level, either to show the horizontality of any piece of work or the verticality of the same in an obvious manner. Preferably one or both tapes will be provided with graduations 40 so that the instrument may be used as a rule or measure. Preferably the sections 13 will be formed of bamboo, though I do not wish to be limited to this.

The device is light, may be readily handled, and is particularly convenient by reason of its expansibility, suiting it to a large variety of uses. Obviously I do not wish to be limited to the details of construction as these might be varied in many ways without departing from the spirit of the invention.

I claim:—

1. A measuring instrument of the character described including oppositely disposed heads, a plurality of sections adapted to be interposed between said heads and the sections having detachable engagement with each other whereby any desired number of sections may be used between the heads to extend or contract the distance between the same, a tape secured to one of said heads, and means mounted upon the other head whereby the tape may be wound up and held in a taut condition.

2. A measuring instrument of the character described comprising oppositely disposed heads, a plurality of sections interposed between said heads, said sections being detachably engaged with each other whereby one or more sections may be used, two steel tapes both attached to one of said heads, and winding devices mounted upon the other head with which the steel tapes are engaged.

3. A measuring instrument of the character described comprising oppositely disposed heads, intermediate sections having detachable engagement with each other and the heads whereby the heads may be disposed at a greater or less distance from each other, each of said heads extending beyond the sections on opposite sides, steel tapes attached to one of said heads and extending parallel to each other on opposite sides of the sections, winding rollers mounted within the other of said heads and upon which the tapes are wound, manually operable means for rotating said rollers to wind up or unwind the tapes, and slidably adjustable means for preventing the unwinding of the rollers.

4. A measuring instrument of the character described comprising oppositely disposed heads, intermediate sections disposed between said heads and separating the same, the sections being detachably engaged with each other and with the heads whereby to space the heads different distances from each other, a steel tape attached at one end to one of said heads, a roller mounted on the opposite head and over which said steel tape is wound, means for causing the winding up of the roller and tightening of the tape, and a level carried upon the tape.

5. A measuring instrument of the character described comprising oppositely disposed heads, intermediate sections disposed between said heads and separating the same, the sections being detachably engaged with each other and with the heads whereby to space the heads different distances from each other, a steel tape attached at one end to one of said heads, a roller mounted on the opposite head and over which said steel tape is wound, means for causing the winding up of the roller and tightening of the tape, a level carried upon the tape, said level including a bubble glass extending parallel to the tape, and a bubble glass extending at right angles to the tape.

6. An instrument of the character described, comprising oppositely disposed heads and intermediate sections, the sections having detachable engagement with the heads and with each other whereby one or more sections may be removed or inserted to thereby increase or decrease the distance between the heads, parallel steel tapes attached to one of said heads, rollers mounted upon the other head and over which said steel tapes are wound, means for rotating said rollers including a gear wheel having ratchet teeth upon one face, and a pawl manually shiftable into or out of engagement with the ratchet wheel.

7. An instrument of the character described comprising oppositely disposed heads and intermediate sections, the sections having detachable engagement with the heads and with each other whereby one or more sections may be removed or inserted to thereby increase or decrease the distance between the heads, parallel steel tapes attached to one of said heads, rollers mounted upon the other head and over which said steel tapes are wound, means for rotating said rollers including a gear wheel having ratchet teeth upon one face, a pawl shiftably mounted upon the head and manually movable into or out of engagement with the ratchet wheel, and a spring resiliently urging the pawl into engagement with the ratchet teeth when the pawl is shifted to its operative position.

8. An instrument of the character described comprising opposed heads, one of said heads having oppositely projecting extensions and each head being formed with a socket, a plurality of intermediate sections, each section being formed at one end with a socket and at the other end with a portion adapted to fit in the socket of an adjacent section, the second head being hollow, rollers disposed in the ends of this hollow head, tapes extending parallel to each other, each secured at one end to the extensions of the first named head and at their opposite ends being secured to the rollers, a driving gear wheel having operative engagement with the rollers and having a crank, adjustable means for preventing back motion of the gear wheel, and bubble glasses carried upon one of said tapes.

In testimony whereof I hereunto affix my signature.

FRANK HOLMGREN.